United States Patent
Fuchsel

[11] 3,883,884
[45] May 13, 1975

[54] PHOTOGRAPHIC CAMERA HAVING AN ACCESSORIES MOUNTING SHOE

[75] Inventor: Harald Fuchsel, Dresden, Germany

[73] Assignee: Veb Pentacon Dresden, Dresden, Germany

[22] Filed: Mar. 21, 1974

[21] Appl. No.: 453,550

Related U.S. Application Data

[63] Continuation-in-part of Ser. No. 359,969, May 14, 1973, abandoned.

[30] Foreign Application Priority Data
Nov. 17, 1972 Germany.............................. 166905
Jan. 15, 1973 Germany.......................... 2301819

[52] U.S. Cl. ................ 354/126; 354/129; 354/147; 354/202
[51] Int. Cl. ........................................... G03b 15/03
[58] Field of Search ............ 354/126, 129, 147, 202

[56] References Cited
UNITED STATES PATENTS
3,286,612  11/1966  Lieser ................... 354/129
3,355,559  11/1967  Hahn et al.................... 354/147 XR FOREIGN PATENTS OR APPLICATIONS
934,929  11/1955  Germany........................... 354/126

Primary Examiner—Richard A. Wintercorn
Attorney, Agent, or Firm—William Anthony Drucker

[57] ABSTRACT

The photographic camera has a centre contact device disposed in a flashgun mounting shoe and a cable socket contact device located on the camera. A first circuit comprising a synchronous shutter switch and the centre contact device and a second circuit comprising the synchronous shutter switch and the cable socket contact device are also provided. A further switch is arranged in the second circuit and an insulating slide located in the shoe is adapted to be operated by the flashgun and which co-operates both with the centre contact device and the further switch to open the latter when the flashgun is inserted and closed when the flashgun is not present.

3 Claims, 3 Drawing Figures 3,883,884

PHOTOGRAPHIC CAMERA HAVING AN ACCESSORIES MOUNTING SHOE

This is a continuation-in-part of application Ser. No. 359,969 filed May 14, 1973, now abandoned.

BACKGROUND TO THE INVENTION

The invention relates to a photographic camera with a centre contact device disposed in the flashgun mounting shoe and a cable socket contact device located on the camera.

Such cameras are already known.

However, where the known contact arrangements are concerned, a disadvantage is that these are constantly connected to each other electrically. For the user, this has the disadvantage that if the unused contact device is unintentionally touched, it may be short-circuited to the earthing lead.

To avoid these disadvantages, it has already been suggested to provide on the camera casing a switch for breaking the electrical connections between the contact devices. However, this switch requires additional operation and thus constitutes an additional demand on the concentration powers of the user.

It is furthermore known to associate with the centre contact device a switch in the flashgun mounting shoe and which, when this contact device is not being used, breaks its electrical connection to the other contact devices.

It is also known that when the further contact device is being used, the contact device provided in the accessories mounting shoe becomes ineffective.

By virtue of their complicated switch arrangements, the said devices are very complex, particularly since these parts have to be incorporated sometimes in the viewfinder shoe and sometimes in the camera casing.

The object of the invention is to use fewer and less complicated components and yet guarantee reliable anti-touch safeguards, with optimum utilisation of the available space, and also to reduce manufacturing costs.

SUMMARY OF THE INVENTION

According to the invention this problem is resolved by providing a first circuit comprising a synchronous shutter switch and a centre contact device disposed in a flashgun shoe, a second circuit comprising said synchronous shutter switch and a cable socket contact device, a further switch arranged in said second circuit, and an insulating slide located in said shoe and adapted to be operated by the flashgun and which co-operates both with the centre contact device and said further switch to open the latter when the flashgun is inserted and closed when the flashgun is not present.

The slide may further include an abutment engageable by the flashgun for moving said slide on insertion of the flashgun and spring means to urge said slide in opposition to the direction in which the flashgun is inserted.

In a further advantageous construction of the invention, the slide has on one side an aperture to allow contact to be made by the centre contact device and may include a further abutment for closing and opening the further switch.

The device also provides for simplified construction in that, when the flashgun is not in use, the centre contact is completely covered. In contrast to the hitherto known construction, wherein the functioning of the switch used to break the centre contact circuit cannot be checked, it is possible with the device according to the invention to ensure a reliable and clearly visible safeguard against physical contact.

BRIEF DESCRIPTION OF THE DRAWINGS

The invention will be explained in greater detail hereinafter with reference to an example of embodiment shown in the attached drawings, in which.

DESCRIPTION OF PREFERRED EMBODIMENT

Figure 1:
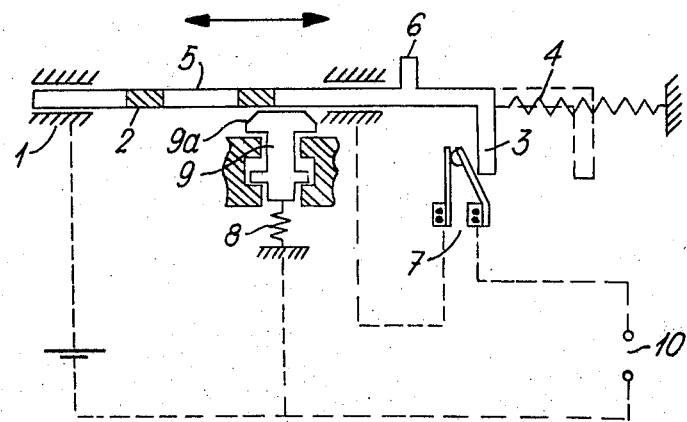
FIG. 1 shows the disposition of the displaceable insulating plate in the flashgun mounting shoe and FIG. 2 shows a wired diagram illustrated in principle on which the device operates.
Figure 2:
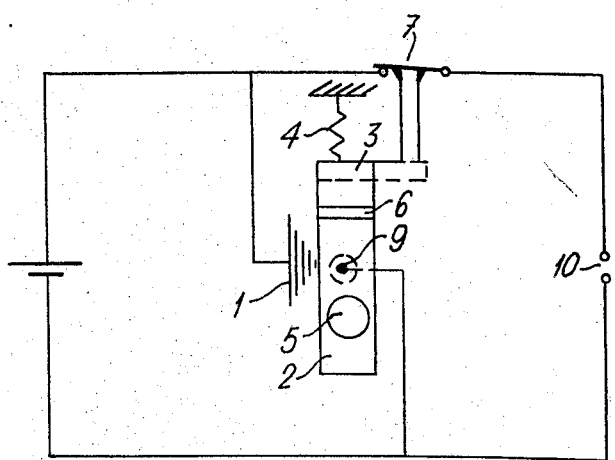
Figure 3:
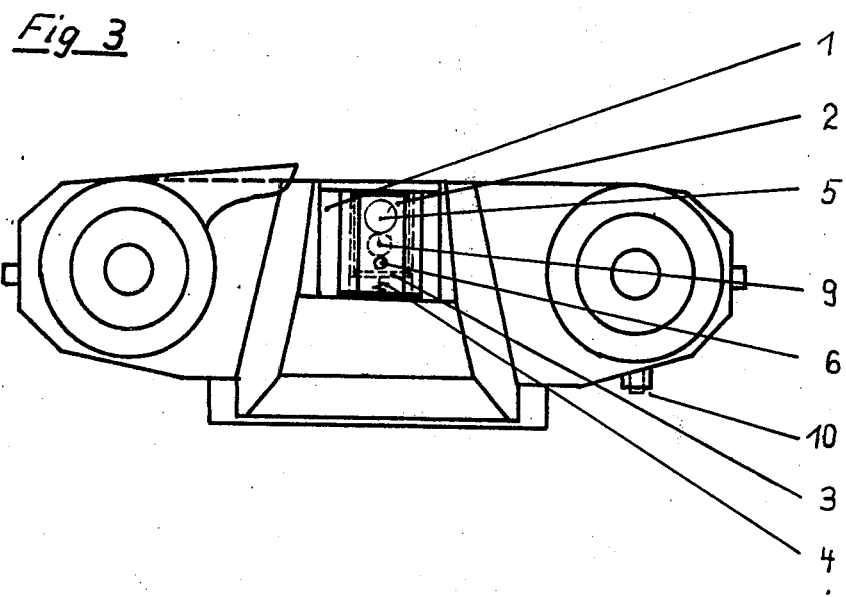
FIG. 3 is a plan view of a camera incorporating the flashgun mounting shoe of the present invention.

An insulating slide 2 movably mounted in the flashgun mounting shoe 1 and connected to an abutment 3 to a drive spring 4 has an aperture 5 and an abutment 6.

The abutment 3 is also connected to a switch 7.

Also disposed in the flashgun mounting shoe 1 is a displaceable centre contact 9 which is subject to the action of a spring 8 and the peripheral surface 9a of which is of conical construction.

A cable socket contact 10 mounted in the camera body is connected in parallel with the centre contact 9 disposed in the flashgun mounting shoe 1. A shutter switch 11 provides the flash synchronisation.

The invention functions in the following way:

When the base of the flashgun is pushed into the shoe 1, the slide 2 is displaced against the force of the spring 4 through the abutment 6. When this happens, the aperture 5 in the slide 2 becomes located over the centre contact 9 which is pre-tensioned by the spring 8, the centre contact 9 passing through the aperture 5 in the slide 2 and coming into contact with the counter-contact on the base of the flashgun.

At the same time, the abutment 3 on the slide 2 releases the spring-loaded contact of the switch 7 so that the cable socket contact 10 disposed in the camera body and connected in parallel with the centre contact 9 becomes isolated from the rest of the circuit.

When the base of the flashgun is removed again from the shoe 1, the drive spring 4 becomes relaxed and restores the slide 2 to its starting position. The switch 7 is thereby closed via the abutment 3 and the centre contact 9 is restored to its insulated position against the force of the drive spring 8 by virtue of the conical surface 9a.

When the cable socket contact 10 is in use, the parallelconnected centre contact is live. The slide 2 which serves as a covering thereby guarantees a reliable safeguard against physical contact.

The shutter switch 11 provides flash synchronisation for both the contact in the flashgun mounting shoe and the cable socket contact.

We claim:

1. In a photographic camera having a flashgun mounting shoe with a centre contact device disposed therein, a cable socket contact device located on the camera, a first circuit comprising a synchronous shutter switch and said centre contact device, a second circuit comprising said synchronous shutter switch and said cable socket contact device, the provision of a. a further switch arranged in said second circuit, b. an insulating slide located in said shoe and adapted to be operated by the flashgun and which cooperates both with the centre contact device and said further switch to open the latter when the flashgun is inserted and closed when the flashgun is not present.

2. A photographic camera according to claim 1, including an abutment engageable by the flashgun for moving said slide on insertion of the flashgun and spring means to urge said slide in opposition to the direction in which the flashgun is inserted.

3. A photographic camera according to claim 2, wherein the slide has on one side an aperture to allow contact to be made by the centre contact device and may include a further abutment for closing and opening the further switch.

* * * * *